(12) United States Patent
Sing et al.

(10) Patent No.: US 11,028,738 B2
(45) Date of Patent: Jun. 8, 2021

(54) PISTON FOR A HYDRAULIC UNIT OF A CAM PHASER AND CAM PHASER

(71) Applicant: ECO Holding 1 GmbH, Marktheidenfeld (DE)

(72) Inventors: Daniel Sing, Murphy, TX (US); John Snyder, Irving, TX (US); Daniel Stanhope, Nunica, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/202,386

(22) Filed: Nov. 28, 2018

(65) Prior Publication Data
US 2019/0093524 A1 Mar. 28, 2019

Related U.S. Application Data

(63) Continuation of application No. PCT/EP2017/067993, filed on Jul. 17, 2017.
(60) Provisional application No. 62/367,635, filed on Jul. 27, 2016.

(51) Int. Cl.
*F01L 1/344* (2006.01)
*F16J 1/09* (2006.01)

(52) U.S. Cl.
CPC ............ *F01L 1/3442* (2013.01); *F16J 1/09* (2013.01); *F01L 2001/34426* (2013.01); *F01L 2001/34433* (2013.01)

(58) Field of Classification Search
CPC .......... F01L 1/3442; F01L 2001/34426; F01L 2001/34433; F01L 1/344; F01L 2001/3443; F16J 1/09

USPC ............... 123/90.15, 90.16, 90.17
See application file for complete search history.

(56) References Cited

U.S. PATENT DOCUMENTS

| 6,763,791 | B2 | 7/2004 | Gardner et al. | |
| 6,799,544 | B1* | 10/2004 | Pierik | F01L 1/022 |
| | | | | 123/90.15 |
| 6,883,481 | B2 | 4/2005 | Gardner et al. | |
| 2012/0325169 | A1* | 12/2012 | Draheim | F01L 1/3442 |
| | | | | 123/90.17 |
| 2014/0116365 | A1* | 5/2014 | Scheidig | F01L 1/3442 |
| | | | | 123/90.17 |
| 2016/0194985 | A1* | 7/2016 | Welte | F01L 1/3442 |
| | | | | 123/90.15 |

(Continued)

FOREIGN PATENT DOCUMENTS

| DE | 3825074 C1 | 10/1989 |
| DE | 3930157 A1 | 3/1991 |

(Continued)

*Primary Examiner* — Devon C Kramer
*Assistant Examiner* — Kelsey L Stanek
(74) *Attorney, Agent, or Firm* — Von Rohrscheidt Patents

(57) ABSTRACT

A piston for a hydraulic unit of a cam phaser, wherein the piston is configured cylindrical and wherein the piston is received axially movable in a cam phaser opening of the cam phaser, wherein according to a positioning of the piston a plurality of connections, in particular operating connections of the cam phaser are opened and closed, wherein the piston includes an outer contour that is configured for opening or closing the connections wherein the outer contour is configured complementary to an inner contour of the cam phaser opening in order to provide opening and/or closing of the connections. The invention also relates to a cam phaser.

13 Claims, 6 Drawing Sheets

(56) References Cited

U.S. PATENT DOCUMENTS

2017/0260884 A1\* 9/2017 Nance .................. F01L 1/3442

FOREIGN PATENT DOCUMENTS

| DE | 102010002713 | 9/2011 |
| EP | 0335083 A1 | 10/1989 |
| JP | H03145507 | 6/1991 |

\* cited by examiner

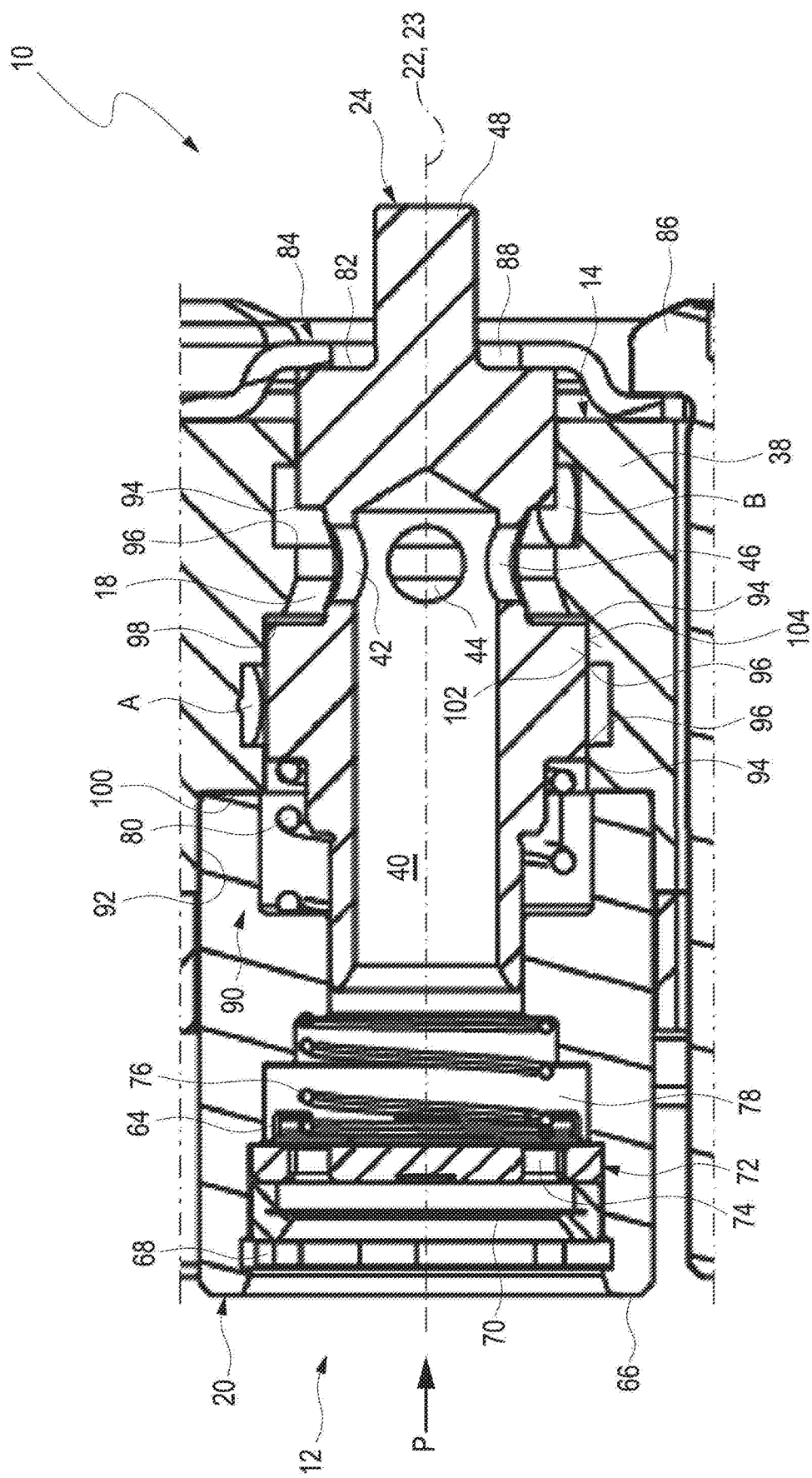
FIG. 1.1

PISTON FOR A HYDRAULIC UNIT OF A CAM PHASER AND CAM PHASER

RELATED APPLICATIONS

This application is a continuation of international application Ser. No. PCT/EP2017/067993 filed Jul. 17, 2017, which claims priority from U.S. provisional patent application Ser. No. 62/367,635 filed Jul. 27, 2016, now abandoned, both of which are hereby incorporated herein by reference in their entirety.

FIELD OF THE INVENTION

The invention relates to a piston for a hydraulic unit of a cam phaser according to the preamble of patent claim 1 and a cam phaser according to patent claim 7.

Hydraulic units for cam phasers for internal combustion engines are well known. The hydraulic unit includes a piston that is axially moveable in a piston housing of a hydraulic unit, wherein the piston controls a hydraulic loading of the cam phaser. There are hydraulic units with different configurations. The housing is typically arranged hollow cylindrical. The piston can be configured hollow cylindrical. Controlling the cam phaser is typically performed by positioning the piston and accordingly opening or closing connections configured at the piston housing. The hydraulic valve is configured in particular as a central valve and positioned in a central opening of the cam phaser.

Thus e.g. the patent documents U.S. Pat. Nos. 6,763,791 B1 and 6,883,481 B2 include hydraulic units including a piston housing entirely receiving the piston wherein the hydraulic units are arranged by the piston housing in a central opening of the cam phaser.

Thus, it is an object of the instant invention to provide a piston for a hydraulic unit of a cam phaser that operates reliably and is cost effective to produce. It is another object of the invention to provide a cam phaser with reduced leakage that is producible in an economic manner. It is another object of the invention to provide a cam phaser with an improved flow between the piston and the cam phaser wherein the cam phaser is producible in an economic manner and provides improved adjustment speeds. It is another advantage of the invention that installation space requirement and weight of the cam phaser are reduced since a diameter of a cam phaser connector can be reduced which is not possible in the prior art.

BRIEF SUMMARY OF THE INVENTION

The object is achieved according of the invention by a piston for a hydraulic unit of a cam phaser with the features of patent claim 1. The other object is achieved by a cam phaser with the features of patent claim 7. Advantageous embodiments with useful and non-trivial embodiments of the invention are provided in the dependent claims.

A piston according to the invention for a hydraulic unit of a cam phaser is configured cylindrical. The piston is received axially movable in an opening of the cam phaser wherein according to a position of the piston various connections, in particular, operating connections of the cam phaser can be opened and/or blocked. According to the invention the piston includes an outer contour that is configured to open and/or close the connections wherein the outer contour is configured complementary to an inner contour of the cam phaser opening in order to provide opening and/or blocking of the connections. The advantage of these contours that are configured complementary to each other is an option of directly positioning the piston in the cam phaser opening, thus in the cam phaser without a piston housing arranged there between.

Typically, and as well known in the art the piston is received in a piston housing wherein the piston is completely arranged in the piston housing. This arrangement is typically known as a hydraulic valve. In order to facilitate flow into the cam phaser and out of the cam phaser with the hydraulic fluid which is controlled by the piston, the piston housing is provided with opening connections which have to align with connections of the cam phaser. Furthermore, the piston housing has to be configured to facilitate an axial displacement of the piston and the opening connections have to be arranged corresponding to the piston contour.

The piston according to the invention is characterized in that it does not require a piston housing and a flow through of the connections, in particular, the operating connections can be performed without additional devices. Thus an outer contour of the piston can be configured adapted to an already provided inner contour of the cam phaser opening so that opening and/or closing of the connections can be implemented without requiring additional housing elements. Thus, an economically producible hydraulic unit can be provided which is much more cost effective than the prior art hydraulic unit.

Another advantage is reducing leakages of the hydraulic fluid since a hydraulic fluid supply directly through the piston and directly into the cam phaser is implemented and the hydraulic fluid does not have to flow through a piston housing like in the prior art. Leakage occurs between the piston housing and each of the openings of the cam phaser which is directly preventable with the piston according to the invention, this means without fluid flowing through the piston housing.

Another advantage is an increase of the fluid flow in and out of the cam phaser, so that an adjustment speed can be increased. The Fluid flow is increased by eliminating the piston housing which reduces the fluid flow during a transfer of the hydraulic fluid from the piston to the cam phaser through corresponding openings.

In an embodiment of the piston according to the invention it is provided with control edges which provide opening and/or closing of the connections, in particular of the operating connections upon a corresponding positioning relative to flow edges of the cam phaser opening. This is advantageous for a precise and quick positioning of the rotor relative to the stator since this induces a quick positioning of the cam shaft.

The piston is advantageously configured with a terminal cover partially enveloping the piston so that the piston is supportable in the cam phaser opening in a simple and secure manner. It is another advantage of the terminal cover partially enveloping the piston that a supply connection can be configured in the terminal cover wherein the supply connection can contain a filter and one way check valve through which the cam phaser is supplied with pressurized hydraulic fluid.

It is also feasible to receive the piston in the cam phaser in its entirety, in particular, in applications where an axial extension of the cam phaser is possible.

In another embodiment the piston includes a central channel, this means the piston is configured hollow. This has the advantage that filling of the piston with hydraulic fluid can be provided with low dynamic flow losses since the supply connection is advantageously arranged in an extension of the central channel.

Another aspect of the invention relates to a cam phaser including a rotor and a stator. A piston is received axially displaceable in a cam phaser opening of the cam phaser wherein various connections, in particular operating connections of the cam phaser are opened and closed corresponding to a position of the piston. According to the invention the piston is configured with the features according to one of the claims 1 through 6. It is an essential advantage of the cam phaser according to the invention in addition to cost reduction by eliminating the piston housing and a leakage reduction and flow increase by eliminating the piston housing that the piston housing is not rotated, put differently not twisted, during assembly of the cam phaser that occurs in the art. The prior art piston housing includes an external thread which provides a connection to the cam shaft. A corresponding tightening force has to be generated by a tightening torque. The tightening torque can warp the piston housing. This warping leads to a displacement of the flow through openings communicating with the piston which can lead to a degradation of the function or to a malfunction. This means put differently that the cam phaser according to the invention operates more reliably.

In another embodiment of the cam phaser according to the invention a terminal cover of the piston which advantageously provides a supply connection to supply the cam phaser with hydraulic fluid is economically configured receivable with a press fit in a hub of the cam phaser, advantageously in a rotor hub of the cam phaser.

In another embodiment of the cam phaser according to the invention the terminal cover is received in a receiving opening of the cam phaser wherein a stop is provided by the receiving opening. The receiving opening is advantageously configured on a side that is oriented away from an actuator moving the piston. The receiving opening has the advantage of safely adjustment and limiting the positioning of the terminal cover and thus of the piston which is partially placed in the terminal cover.

In order to safely and movably receive the piston an arresting element is provided. The arresting element is arranged on a side of the cam phaser which is oriented towards the actuator. It is an advantage of the arresting element that the piston is secured against impermissible axial displacement.

Advantageously the arresting element is arranged by fastening elements, ideally for indestructible dismounting by bolts or equivalent devices at the cam phaser in a non-movable manner.

In order to provide safe positioning of the piston the arresting element includes an opening in which either the piston can engage or the piston can engage with a piston pinion or the actuator can engage with a plunger. Thus, a direct contact can be provided between the piston and its piston pinion and the plunger so that a reliable positioning of the piston can be provided in the cam phaser opening.

BRIEF DESCRIPTION OF THE DRAWINGS

Additional advantages, features and details of the invention can be derived from the subsequent description of advantageous embodiments and from the drawing figures. The features and feature combinations recited in the preceding description and the features and feature combinations recited in the subsequent figure description are not only useable in the respectively stated combination but also in other combinations or by themselves without departing from the spirit and scope of the invention. Identical or functionally equivalent elements are associated with identical reference numerals. For reasons of clarity it is possible that the elements are not provided with reference numerals in all figures without however losing their association, wherein:

FIG. 1.1 illustrates a detail view I.I of the piston according to the invention according to FIG. 1;

DETAILED DESCRIPTION

Figure 1:
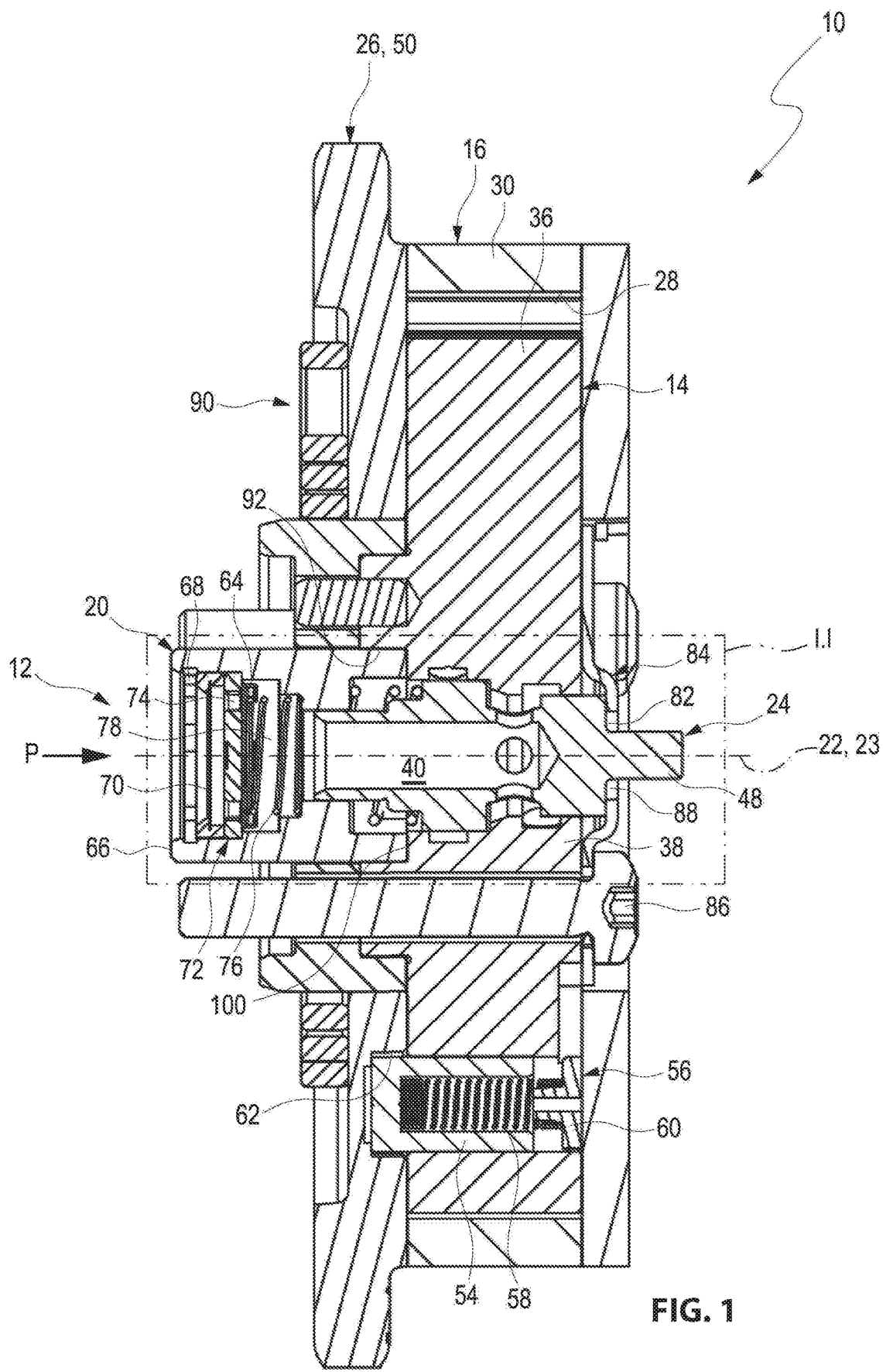
FIG. 1 illustrates a longitudinal sectional view of a cam phaser according to the invention for a cam shaft with a piston according to the invention in a first embodiment.

A cam phaser 10 according to the invention for an internal combustion engine that is not illustrated in more detail for adjusting valve timing, put differently opening and closing times of gas exchange valves of the internal combustion engine is configured according to FIG. 1. The cam phaser 10 facilitates providing a change of valve timing during operation of the internal combustion engine. For this purpose the cam phaser 10 adjusts an angular position of a cam shaft of the internal combustion engine that is not illustrated in more detail relative to a crank shaft of the internal combustion engine that is not illustrated in more detail, wherein the cam shaft is rotated relative to the crank shaft continuously variably. Rotating the cam shaft moves the opening and closing times of the gas exchange valves so that so that performance and/or fuel burn and/or emissions of the internal combustion engine are optimized under various operating conditions.

The cam phaser 10 includes a hydraulic unit 12 which controls a hydraulic fluid flowing through the cam phaser 10. The cam phaser 10 essentially includes a rotor 14 and a stator 16 enveloping the rotor 14. The hydraulic unit 12 is configured to be received in the rotor 14. Put differently the hydraulic unit 12 is received in a central cam phaser opening 18 of the cam phaser 10 and at least partially enveloped by the cam phaser. The cam phaser opening 18 is provided as an opening of the rotor 14.

The hydraulic unit 12 includes a piston 24 according to the invention that is axially movable along a first longitudinal axis 22 of the hydraulic unit 12, c.f. also FIG. 1.1, wherein the piston 24 is at least partially received in the center cam phaser opening 18 which is preferably provided as an opening of the rotor 14.

The first longitudinal axis 22 is configured coaxial with a second longitudinal axis 23 of the cam phaser opening 18. Furthermore, the piston 24 is at least partially received in a terminal cover 20 of the hydraulic unit 12 which assures a fluid supply of the piston 24 and thus of the cam phaser 10 through a supply connection P configured at the terminal cover 20.

Figure 2:
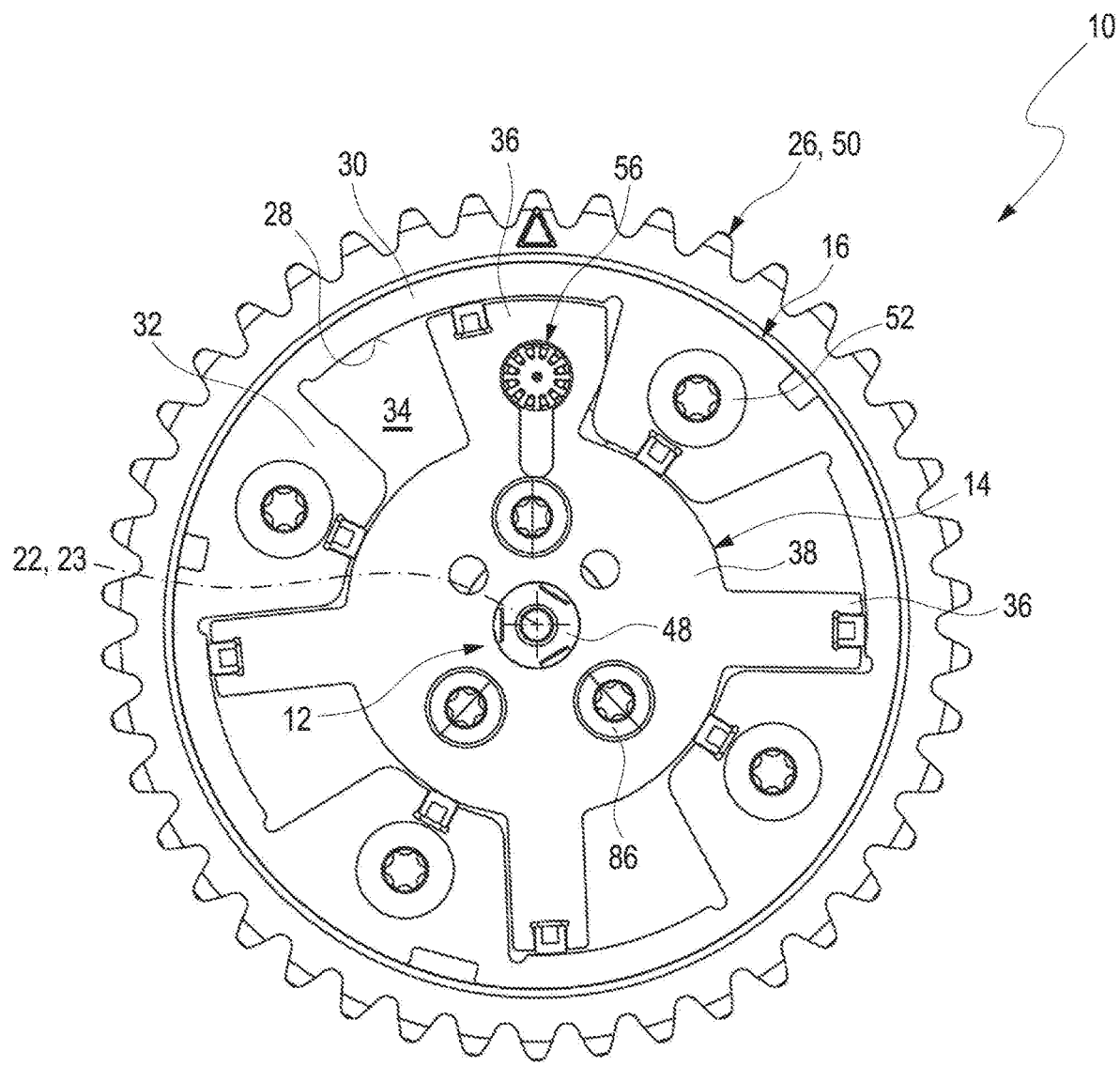
FIG. 2 illustrates a top view of the cam phaser according to the FIG. 1.

The stator 16 of the cam phaser 10 is connected torque proof with a drive wheel 26 of the cam shaft. At insides 28 of a stator base element 30 radially inward extending bars 32 are configured in even intervals so that an intermediary space 34 is formed between two respectively adjacent bars 32 as illustrated, in particular, in FIG. 2. A blade 36 of the rotor hub 38 of the rotor 14 is arranged so that it protrudes into an intermediary space 34. Corresponding to a number of the intermediary spaces 34 the rotor hub 38 includes a number of blades 36. Thus, each intermediary space 34 is divided into two pressure cavities by the blades 36. The blades 36 are integrally provided in one piece with the rotor hub 38 so that the rotor 14 is integrally provided in one piece. A pressure medium, typically a hydraulic fluid is introduced into the pressure cavities in a controlled manner by the hydraulic unit 12.

Each of the two pressure cavities separated by a blade 36 includes an operating connection A; B. This means put differently that one pressure cavity of the pressure cavities separated by the blade 36 includes the first operating connection A and the other of the two pressure cavities separated by the blade 36 includes the second operating connection B.

In order to change an angular position between the cam shaft and the crank shaft the pressure medium in one pressure cavity or in a second pressure cavity is pressurized, this means a pressure is increased, while the second pressure cavity or the first pressure cavity is unloaded. The unloading is performed through at least one tank drain T that is not illustrated in more detail through which the hydraulic fluid can drain. The pressure increase can also be assisted by non-return valves which open as a function of camshaft torque.

The piston 24 is configured cylindrical and includes a central channel 40 extending along the first longitudinal axis 22, through which flow through openings distributed over a circumference, a first flow through opening 42, a second flow through opening 44, a third flow through opening 46 and a fourth flow through opening that is not illustrated in more detail and arranged opposite to the second flow through opening can be supplied with hydraulic fluid. Each pair of operating connections A, B is associated with a flow through opening 42; 44; 46. This means put differently as evident from FIG. 2, a total of eight pressure cavities is provided, wherein two respective pressure cavities are separated by one of a total of four blades 36 of the rotor 14 and the piston includes four pass through openings.

The piston 24 is positioned by an electromagnetic actuator that is not illustrated in more detail so that a corresponding loading of the pressure cavities can be provided. An actuator plunger that is not illustrated in more detail of the actuator is configured so that it engages a piston pinion 48 so that the piston 24 is positioned in the phaser opening 18 by the actuator.

In addition to the rotor 14 and the stator 16 the cam phaser 10 includes a safety disc 50 which is configured for axially securing the rotor 14. In this embodiment the safety disc 50 is configured as a drive wheel 26.

The safety disc 50 is connected torque proof with the stator 16 by the attachment devices 52. Furthermore, the safety disc 50 is used for receiving a locking pin 54 of a locking device 56 of the cam phaser 10, wherein the locking device 56 further includes a reset element 58 configured as a spiral spring and a cover element 60. In order to interlock the rotor 15 with the stator 16 the locking pin 54 is positioned in a receiving opening 62 of the safety disc 50.

A back flow of the fluid into the supply connection P is prevented by a check valve 64 which is arranged in a portion of a cover end 66 that is oriented away from the piston pinion 48 and downstream of a fluid filter 70 secured in position by a safety element 68 in the terminal cover 20. A safety disc 72 is received between the check valve 64 which is configured as an annular check valve and the fluid filter 70 in the terminal cover 20, wherein disc openings 74 of the flow disc 72 are closeable by the check valve 64.

The check valve 64 is loaded by a first preload element 76 in a direction towards the flow disc 72. This means put differently the check valve is pressed by the first preload element 76 against the flow disc 72 for closing the disc openings 74. As soon as the hydraulic fluid flowing over through the supply connection P has a pressure which is greater than a pre load force of the first preload element 76 and the pressure in the central channel 40, the check valve 64 lifts off from the flow disc 72 and the hydraulic fluid enters through the disc opening 74 into an entry channel 78 of the terminal cover 20 wherein the entry channel 78 is flow connected with the central channel 40.

In order to arrest and support the piston 24, the piston 24 is supported in an entry channel 78 and preloaded by a second preload element 80 relative to the terminal cover 20. In order to further arrest and support the piston 24 a piston end 82 of the piston 24 that is oriented away from the cover end 66 is secured by an arresting element 84 at the rotor hub 38 through additional attachment devices 86. The arresting element 84 includes an opening 88 for receiving the piston pin 48 in an axially movable manner. Thus, the piston 24 is arranged axially movable in the adjustment opening 18, wherein the axial movement of the piston 24 is limited at one end by the terminal cover 20 and at another end by the arresting element 84.

The terminal cover 20 is configured so that it contacts the rotor 14 wherein a press fit is advantageously provided between the terminal cover 20 and a receiving opening 92 that is configured at a rotor side 90 that is oriented away from the arresting element 84.

As illustrated in FIG. 1 the flow through or emptying of the pressure cavities is performed by operating connections A, B communicating directly with the piston 24 wherein the operating connections A, B are configured in the cam phaser opening 18. For this purpose the piston 24 includes control edges 94 in addition to the pass through openings 42, 44, 46 wherein flow control edges 96 of the operating connections A, B of the cam phaser opening 18 are covered and/or released by the control edges 94. An inner contour 102 of the cam phaser opening 18 is configured complementary to an outer contour 104 of the piston 24 for opening or closing the operating connections A, B. The term complementary does not mean in this context that the inner contour and the outer contour match each other, but they are oriented towards each other and configured to provide a communication between the pass-through openings and the connections, in particular, the operating connections A, B.

The terminal cover 20 is supported at the rotor hub 38 at an additional stop 100 which is also configured annular.

FIGS. 3-8 illustrate three additional embodiments of the piston 24 according to the invention and of the cam phaser 10 according to the invention. Compared to the first embodiment the piston 24 of the second to fourth embodiment is received in its entirety in the cam phaser 10. Put differently this means that the terminal cover 20 can be omitted in this embodiment.

Figure 3:
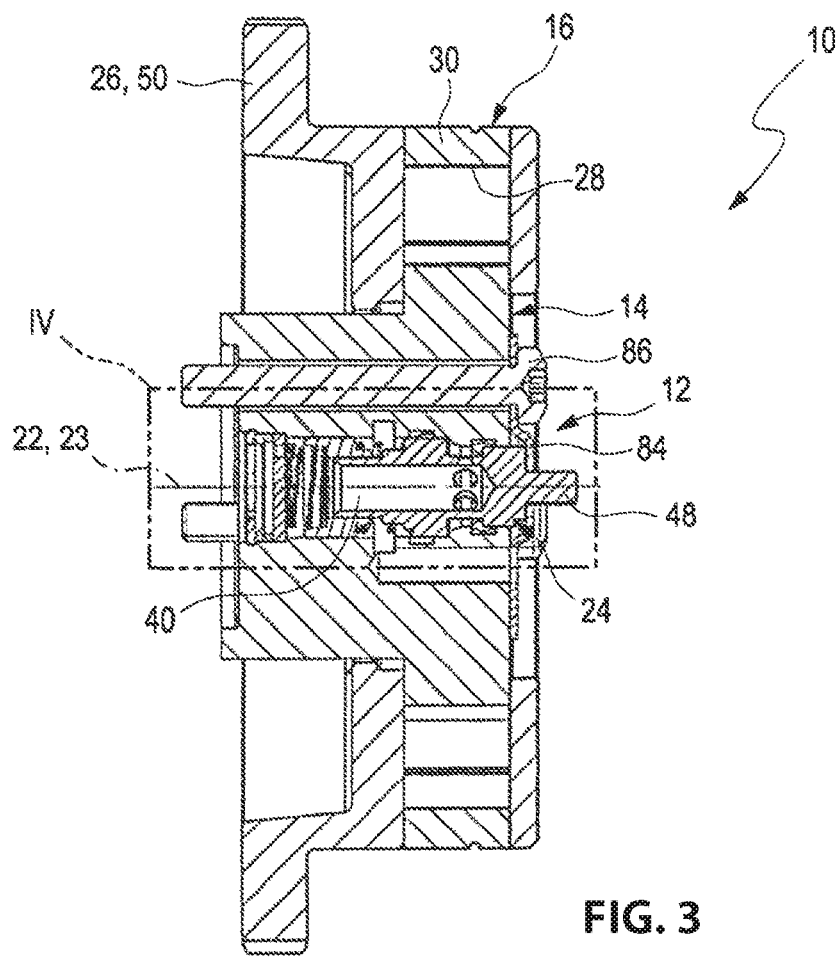
FIG. 3 illustrates a longitudinal sectional view of a cam phaser according to the invention with the piston according to the invention in a second embodiment.
Figure 4:
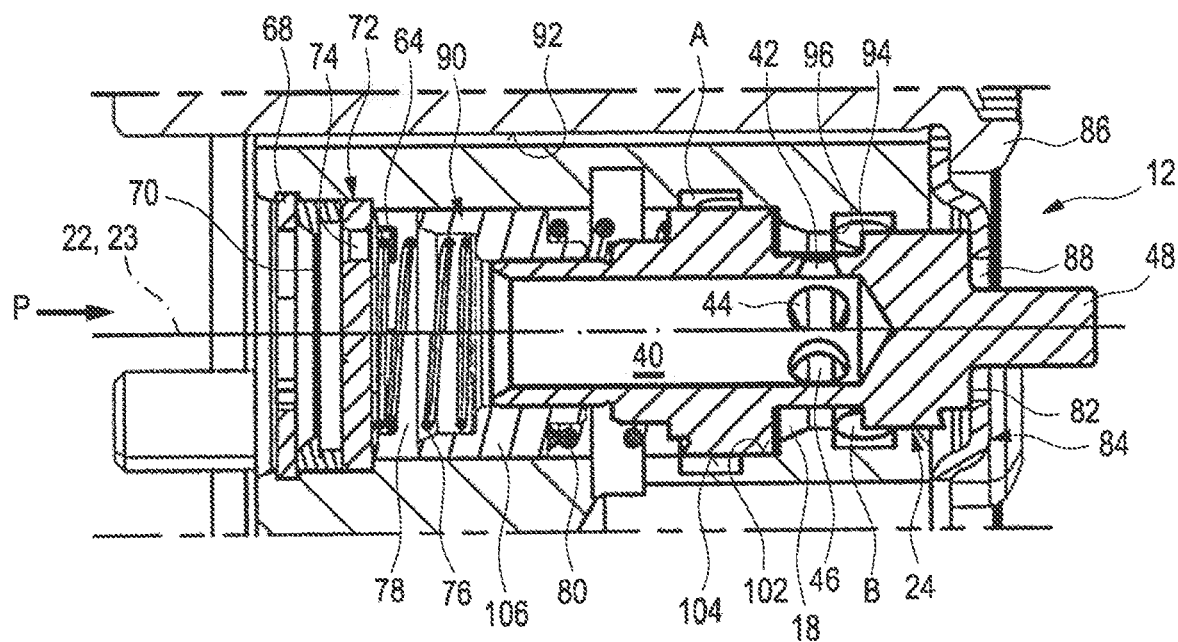
FIG. 4 illustrates a sectional view IV of the cam phaser according to FIG. 3.

FIG. 3 illustrates a longitudinal sectional view of the cam phaser 10 in a second embodiment. FIG. 4 illustrates the corresponding piston 4 in a detail of the cam phaser 10. In this embodiment a support element 106 is configured which is received in its entirety in the cam phaser opening and is used for supporting a first preload element 76 and a second preload element 80. The cam phaser opening 18 is configured to receive the safety element 68; the fluid filter 70, the flow disc 72 and the first preload element 76.

Figure 5:
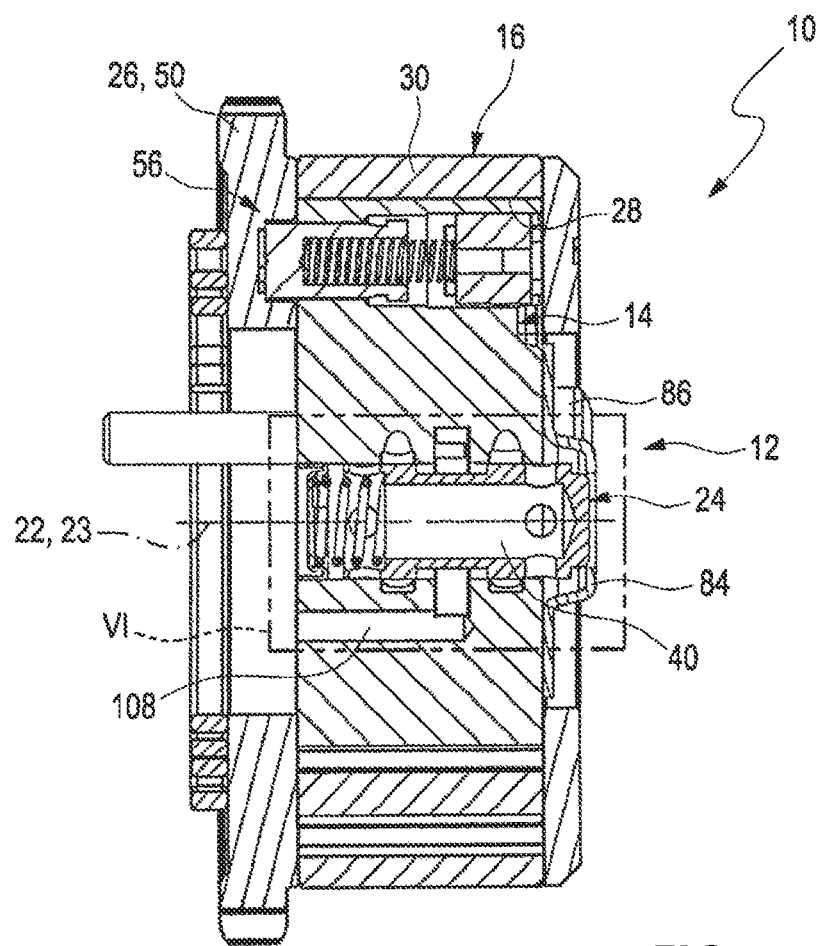
FIG. 5 illustrates a longitudinal sectional view of the cam phaser according to the invention with the piston according to the invention in a third embodiment.
Figure 6:
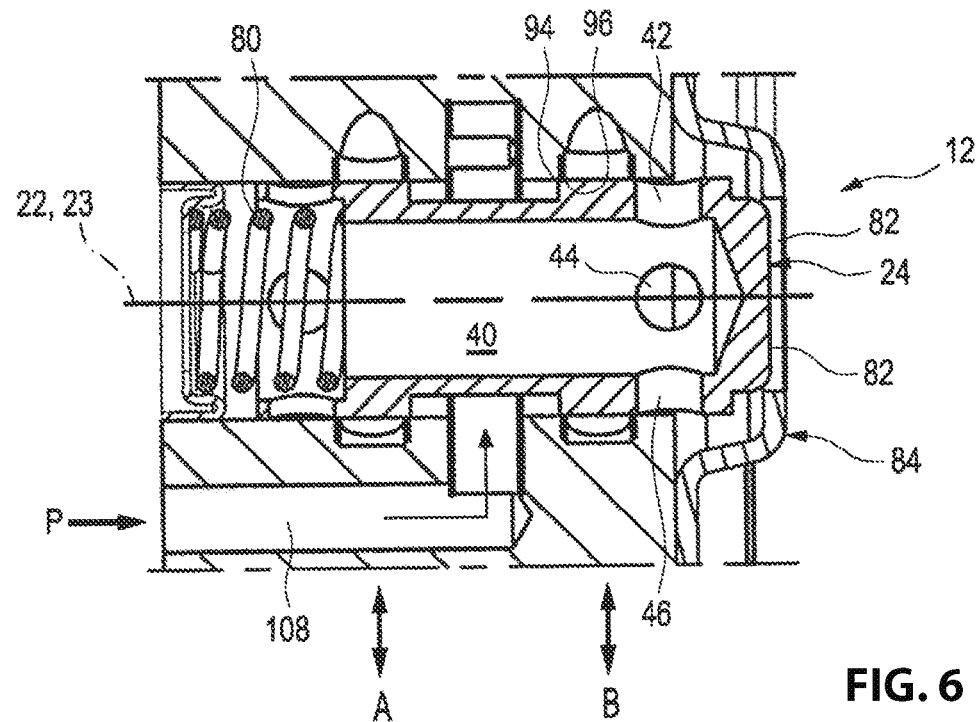
FIG. 6 illustrates a detail VI of the camp phaser according to FIG. 5.

FIGS. 5 and 6 illustrate a longitudinal sectional view of the cam phaser 10 or of the corresponding piston 24 in a detail of the cam phaser 10 in a third embodiment. The cam phaser 10 includes a supply channel 108 that is arranged off center from the first longitudinal axis 22 wherein the supply channel is flow connected with the supply connection P. The supply channel 108 is flow connected with the piston 24 wherein hydraulic fluid flowing through the supply channel 108 can flow between the flow through openings of the operating connections A, B. Compared to first embodiment and the second embodiment where supply fluid is routed through the central channel 40 of the piston, supply fluid is routed through the phaser 10. In this case, the central channel 40 serves as tank connection T.

Figure 7:
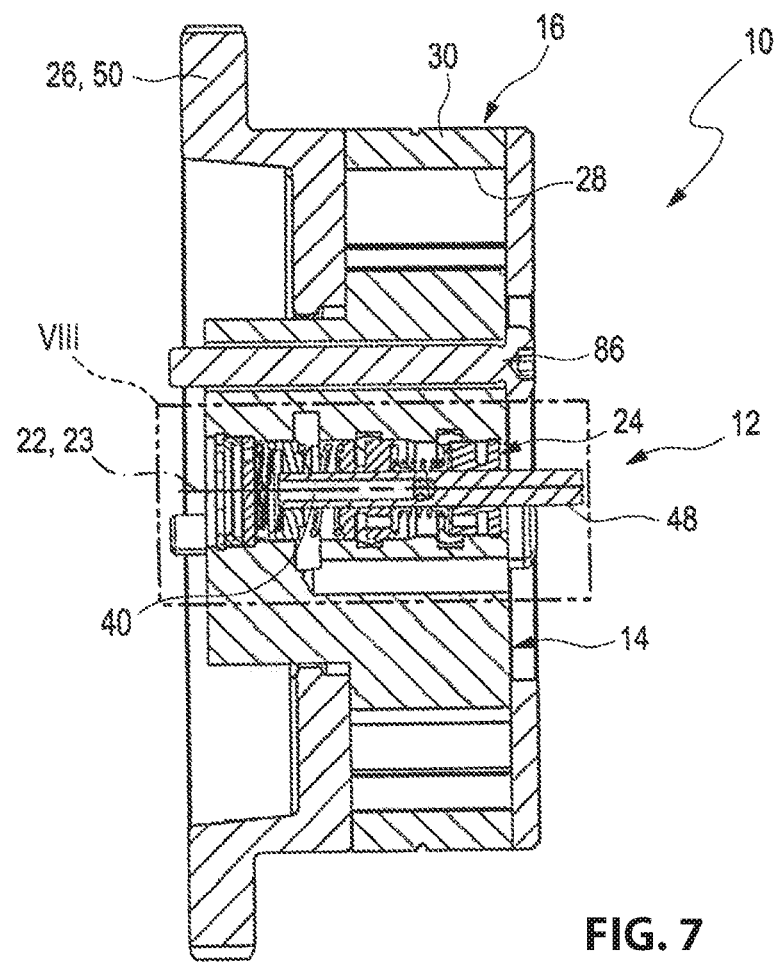
FIG. 7 illustrates a longitudinal sectional view of the cam phaser according to the invention with the piston according to the invention in a fourth embodiment.
Figure 8:
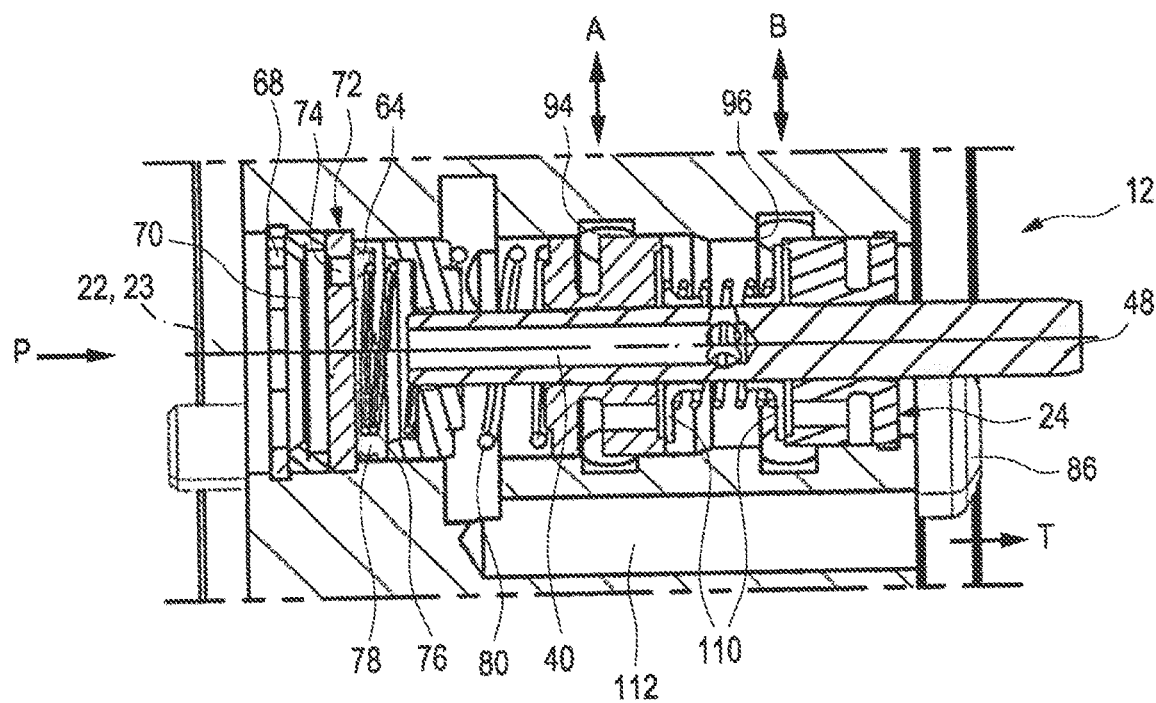
FIG. 8 illustrates a detail VIII of the cam phaser according to FIG. 7.

FIG. 7 illustrates the cam phaser 10 according to the invention in a longitudinal sectional view in a fourth embodiment and FIG. 8 illustrates the corresponding piston 24 in a detail of the cam phaser 10. The supply connection P like in the first two embodiments is configured coaxial with the first longitudinal axis 22 so that the supply connection P can flow through the piston 24. The piston 24 includes two additional check valves 110 that are arranged in the portion of the pass through openings 42, 44, 46. The piston 24 is configured to utilize cam shaft torques and their associated pressure pulses in the cam phaser 10. A tank connection T is configured off center from the first longitudinal axis 22 in the cam phaser 10 and flowable through a drain channel 112.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. A piston for a hydraulic unit of a cam phaser,
   wherein the piston is configured cylindrical and wherein the piston is configured to move axially within a cam phaser opening of the cam phaser,
   wherein a plurality of operating connections of the cam phaser are opened and closed according to a positioning of the piston,
   wherein the piston includes an outer contour that is configured for opening or closing the plurality of operating connections wherein the outer contour is configured complementary to an inner contour of the cam phaser opening in order to provide opening or closing of the plurality of operating connections,
   wherein the cam phaser opening is formed by an inner surface of a rotor of the cam phaser and the rotor including rotor blades is integrally formed from one piece of material, and
   wherein the piston slides directly on the inner surface of the rotor.

2. The piston according to claim 1,
   wherein the piston includes control edges which cause opening or closing of the plurality of operating connections for a corresponding positioning relative to flow control edges of the cam phaser opening.

3. The piston according to claim 1, wherein the piston is secured by a terminal cover which partially envelops the piston.

4. The piston according to claim 3, wherein the terminal cover is provided for providing a supply connection.

5. The piston according to claim 1, wherein the piston includes a central channel.

6. The piston according to claim 1, wherein flow through openings of the piston are supplied with hydraulic fluid through a central channel of the piston to supply the plurality of connections.

7. A cam phaser, comprising:
   a rotor;
   a stator; and
   a piston that is received axially movable in a cam phaser opening of the cam phaser,
   wherein different operating connections of a plurality of operating connections of the cam phaser are opened and closed corresponding to a positioning of the piston, and
   wherein the piston and the rotor are configured according to claim 1.

8. The cam phaser according to claim 7, wherein a terminal cover of the piston is received in a hub of the cam phaser with a press fit.

9. The cam phaser according to claim 8, wherein the hub is rotor hub of the rotor.

10. The cam phaser according to claim 7,
    wherein the terminal cover is received in a receiving opening of the cam phaser, and
    wherein a stop is formed by the receiving opening.

11. The cam phaser according to claim 7, wherein an arrester element is configured to receive the piston in a secured and movable manner.

12. The cam phaser according to claim 11, wherein the arrester element is fixed at the cam phaser by fastener elements.

13. The cam phaser according to claim 11, wherein the arrester element includes an opening for receiving a piston pinion of the piston or the piston or an actuator plunger.

* * * * *